Patented July 19, 1949

2,476,512

UNITED STATES PATENT OFFICE 2,476,512

N-2-ETHYL HEXYL $\alpha,\alpha'$-DI-KETO $\beta,\beta'$-(1,4-$\Delta^2$-CYCLOPENTENYLENE)-PYRROLIDINE AND SYNTHESIS THEREOF

Albert A. Schreiber, Salem, N. Y., assignor to Van Dyk & Company, Inc., Belleville, N. J.

No Drawing. Application March 8, 1947, Serial No. 733,435

5 Claims. (Cl. 260—326)

The present invention relates to a new condensation product having parasiticidal properties, and to compositions containing the same as a parasitcicide component. The invention also relates to a process for preparing said condensation product.

Most of the numerous compounds suggested in recent years as active components of insecticide compositions have various disadvantages. They are either relatively expensive or do not have sufficient parasiticidal power, or, particularly, are lacking in the desirable property of quickly paralyzing the pests, especially flies, i. e. in the high "knockdown" value. This property is particularly inherent with pyrethrins of pyrethrum, which, therefore, are used to a large extent in spite of their high price.

Certain amides of carboxylic acids have been recently suggested as insecticide components, especially for partial replacement of pyrethrins, and it has been assumed that the butyl and amyl amines give the most satisfactory amides, even though these amines have a substantial physiological effect on human beings and warm blooded animals.

I have now found that a new compound of high parasiticidal value and high solubility, which allows of dispensing with pyrethrins almost completely, may be produced from harmless starting materials and in excellent yields by proceeding in the manner described hereinafter.

The compound has apparently the structure of N-2-ethyl-hexyl $\alpha,\alpha'$-di-keto $\beta,\beta'$-(1,4-$\Delta^2$-cyclopentenylene) pyrrolidine, that is an imide of tricyclic structure.

This compound can be synthetized in various ways. For example, the respective N-2-ethyl hexyl di-keto pyrroline may be first formed by condensation of maleic anhydride with 2-ethyl hexylamine, preferably in the presence of an organic solvent of the benzene series, such as benzene, toluene or the xylenes, to form $\alpha,\alpha'$-di-keto N-2-ethyl hexyl pyrrolidine. The latter is condensed with monomeric ccyclopentadiene, preferably in the presence of a diluent, such as a solvent of the benzene series, or in the presence of water, so as to allow a better control of the substantial reaction heat. However, by-products are formed in these steps, especially in aqueous medium, and the yields obtainable in these steps are not satisfactory.

A better method giving excellent yields consists in first condensing maleic anhydride with monomeric cyclopentadiene in a manner known by itself (see Liebig's Annalen der Chemie, vol. 460, pp. 98 and 111, 1928), and then condensing the resulting $\alpha,\beta$-(1.4-$\Delta^2$-cyclopentenylene-succinic acid anhydride, of the formula

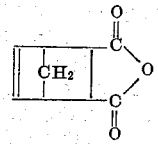

with 2-ethyl hexylamine.

The monomeric cyclopentadiene can be obtained by running an appropriate current of commercial di-cyclopentadiene into a still, the bottom of which at least is kept at from 165° to 195° C. and which is provided at the top outlet with a dephlegmator kept at from about 42° to 46° C. A continuous flow of monomeric cyclopentadiene is thus obtained with very little loss when the influx of the dimeric compound is adjusted to the outflow from the dephlegmator of the monomeric compound. This current of monomeric cyclopentadiene is directly introduced near the bottom of a column of an about equimolecular proportion of maleic anhydride dispersed in an about equal quantity of a dry solvent of the benzene series, preferably benzene itself. In view of the low boiling point of the cyclopentadiene of 42° C. and of the substantial heat of reaction the reaction mass is kept best at from 20° to 30° C. by cooling and is preferably stirred at least near the influx of the cyclopentadiene, though a slight rise above the temperatures stated does not subsantially impair the product or the yield thereof. After at least an equimolecular quantity of cyclopentadiene has been introduced and any excess thereof has been removed by warming to, say, 45° C. or by blowing or both, or has been diverted into a second reaction vessel containing a maleic anhydride dispersion, the reaction mass is left standing for a short time preferably while cooling to about 10° to 15° C. During this period, if not earlier, most of the desired succinic anhydride separates in colorless crystals, having a melting point, after separating and drying, of 165° C. The crystals are filtered off by suction, or centrifuging, and the mother liquor may be partly evaporated for the recovery of another crop. From the last filtrate small quantities of maleic acid may be recovered, especially if the solvent used contained some water. Even then almost quantitative yields of cyclopentenylene succinic anhydride may be obtained, however.

The succinic acid anhydride obtained in the above described manner, is then dissolved in an equal or higher amount of a dry solvent of the benzene series for the conversion into the di-keto pyrrolidine with the aid of 2-ethyl hexylamine. If benzene or toluene has been used as the solvent in the preparation of the succinic anhydride, it would seem obvious to react the resulting reaction mixture with 2-ethyl-hexylamine, i. e. without the separation of the succinic anhydride. I have found, however, that a much purer pyrrolidine product and much higher yields thereof are obtained if the succinic anhydride is separated from the reaction mixture as described and reacted with 2-ethyl hexylamine. It has also been found that, in the formation of the pyrrolidine better yields are obtained by the use of toluene as the solvent than with benzene. It is, therefore, best to introduce, while stirring, an about equimolecular amount, if desired, with a slight excess of 2–5%, of dry 2-ethyl hexylamine into a solution of the succinic anhydride in dry toluene warmed to about 50° C. in a reaction vessel provided with a reflux condenser and a trap to collect water from the refluxing liquid. While stirring, the temperature of the reaction mixture is then raised to about 100° C. and kept there until some water appears in the trap and then raised further to substantial refluxing. After 1 molecular proportion or more of water has accumulated in the trap, depending on the degree of dryness of the raw materials, the mixture is stirred for a short time at the last temperature reached. Depending on the available facilities, the amber colored reaction mixture may be freed from solvent by distillation and then distilled in vacuo at about 2 mms. mercury, if desired after the addition of a small quantity of soda ash, or after washing with a small amount of 10–20% aqueous sodium carbonate or bicarbonate solution and separating therefrom at any stage.

The amber, slightly viscous liquid thus obtained has a specific gravity of 1.05 at 20° C. and a refractive index $n_D^{20}$=at least 1.505 and consists of almost pure n-2-ethyl-hexyl $\alpha,\alpha'$-di-keto $\beta,\beta'$-(1,4-$\Delta^2$-cyclopentenylene) pyrrolidine of the apparent formula

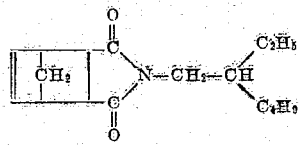

On distillation it gives, with almost no forerun and tails, a pale amber liquid boiling from 156°–158° at 2 mms. mercury. The yield is almost quantitative.

If it is desired to use the product in the form of a solution thereof in an anhydrous, water-insoluble solvent having a boiling point above those of the reaction solvent and of the amine, as for example a kerosene fraction of petroleum, such diluent may be added before the condensation, for example in a quantity of from 20 to 65% of the weight of the reaction solvent, and only the reaction solvent and any excess of amine are distilled off. Of course, such high boiling diluent should be inert and not contain any constituents capable of reacting with the succinic anhydride or the amine under the conditions of working. An addition of kerosene in the amount of ⅔ the weight of the toluene for example gives the incidental advantage of reducing the time required for the cleavage of water by about ⅕ to ¼. According to the capacity of the condenser and the degree of heating depending thereon, the reaction takes approximately from 3½ to 4 hours without the addition of such diluent.

The pyrrolidine is easily miscible with common kerosene and "deobase," the deodorized kerosene solvent often used in parasiticidal spray preparations, and also with heavy mineral oil (white oil). It is also soluble to the extent of at least 20% in the lower halogenated hydrocarbons, such as carbon tetrachloride, chloroform, ethylene di- and tri-chlorides and the mixed fluorinated chlormethanes as are used in the so-called "aerosols." Solutions of the pyrrolidine, or the pyrrolidine itself, can be emulsified in water or aqueous solutions with the aid of a commercially available emulsifier, especially those derived from polyglycols, such as condensation products of phenols or aromatic alcohols, or of long chain fatty acids or alcohols, with from 10–25 molecular proportions of ethylene oxide which are harmless to leaves and roots of plants so that such emulsions, usually after further dilution with water, can be used for spraying or watering or both. Since the pyrrolidine is also easily soluble in such low-boiling solvents which are normally not used in sprays, as for example the lower aliphatic alcohols from methanol to butanol, ketones like acetone, isophorone, mesityloxide, cyclohexanone and diacetone alcohol, low boiling petroleum fractions, such as gasoline, and esters like ethylacetate, such solutions may be employed with advantage for the manufacture of solid dispersions of the pyrrolidine. For example such solutions may be incorporated with solid carriers, as for example mineral dust such as talcum, powdered sulphur, saw dust or pyrethrum flowers, or the dried residues from the extraction of the latter, care being taken to select the solvent so that the intended carrier is not attacked by it. After combining the solution with the carrier by mixing or spraying, the solvent may be removed and recovered in any usual and convenient way. On the other hand, the pyrrolidine has the valuable property of dissolving up to about half its weight of di-(p-chlorphenyl)-trichloroethane and homologues and analogues thereof.

The parasiticidal effect of the pyrrolidine is not restricted to flies, though most conveniently tested thereby, even cockroaches of the rather resistant German variety are easily eliminated for instance by a spray containing 1% of the pyrrolidine and the unusually low concentration of from 0.2 to 1% of di-(p-chlorphenyl)trichloroethane even without an addition of pyrethrins. Generally speaking, insecticide sprays may contain 1 part of the pyrrolidine, from 1/100 to 2/100 its weight of pyrethrins and from 50 to 200 parts of a solvent, such as a deodorized kerosene. In most cases a concentration of 1% weight/by volume of pyrrolidine to kerosene is sufficient.

Comparative, reproducible tests are carried out best on flies according to the well known Peet Grady method, and have shown, for example, the following results:

The percentage "kill" (in 24 hours) of a 1% solution in deodorized kerosene of the pyrrolidine equals that of an 0.1–0.2% solution of top grade pyrethrins, giving a kill of more than 45% in the official test concentration of 0.1% (O. T. I.).

The "knockdown" (in 10 minutes) of a 1% solution in the said kerosene of the pyrrolidine alone is about 60–65% of that of the said 0.1% solution of pyrethrins. By adding as little as 0.01–0.02% of pyrethrins to said 1% solution of pyrrolidine in kerosene, the knockdown is increased to almost 100%, while the pyrethrins alone at the said concentration give a knockdown of about 70% only.

Accordingly, the content of pyrethrins and, hence, the cost of active constituents in commercial parasiticides and in particular insecticides, may be reduced by the use of the pyrrolidine in a degree hitherto not possible.

The following examples will further illustrate the nature and scope of the present invention which is not limited, however, to this specific disclosure. The parts indicated are by weight.

*Example 1*

98 parts (1 mol) of maleic anhydride are dissolved as far as possible at 20° C. in about 500 parts by dry benzene and 69.3 parts (1 mol+5%) of monomeric cyclopentadiene (B. P. 42° C.) are introduced near the bottom of the said mixture at such speed and with external cooling with cold water that, while stirring with a small, high speed stirrer near the inflow of the cyclopentadiene, the temperature does not rise substantially above 30° C. After the whole quantity of the cyclopentadiene has been introduced and the whole stirred for about 10 minutes, the small excess of cyclopentadiene is blown out with a current of dry air into another vessel containing a maleic anhydride dispersion and the reaction mass is cooled to 15° C. During this cooling, and sometimes even already during the introduction of the cyclopentadiene, white crystals appear which multiply rapidly, converting the whole mass into a soft pulp. The crystals are separated by filtration by suction, or by centrifuging, remainders of benzene being removed by warming or in vacuo. After the first crop of 1.4-$\Delta^2$-cyclopentenylene succinic anhydride, having a melting point of 165° C., has been removed, the mother liquor may be inspissated to about ⅓ and another crop may be recovered and the whole yield rises to about 95% of that theoretically possible. If the raw materials contain appreciable amounts of water the yield is somewhat lower and the final mother liquor contains some maleic acid.

164 parts (1 mol) of the succinic anhydride thus obtained are warmed to about 50° C. with from 160-180 parts of dry toluene in a closed kettle provided with an efficient reflux condenser and a trap attached thereto to collect water from the refluxing liquid before the latter returns to the kettle. While stirring, 132.9 parts (1 mol+3%) of dry 2-ethyl hexylamine (B. P. 166°-168° C.) are introduced and the temperature is slowly raised to about 95° C. and kept there until water appears in the trap. The temperature is then raised to rapid refluxing controlled by the efficiency of the condenser used. Depending on the latter, 18 parts (1 mol) of water accumulate in the trap in about 4 hours together with any additional water as may have been present in the initial materials. The amine may also be introduced into the solution of the succinic anhydride warmed to about 90° C., the velocity of the addition depending on the efficiency of the condenser employed. The amber colored liquid is then cooled to about 40° C., stirred for about 10 minutes with about 20 parts of an about 14% aqueous sodium carbonate solution and then separated therefrom. The toluene is then distilled off, the last traces thereof and remainders of the amine being removed preferably in vacuo. About 274 parts of amber colored, somewhat viscous fluid are thus obtained. This may be further purified by vacuum distillation at 2 mms. mercury. As practically no forerun and tails occur hereby and as the physical data remain practically unchanged except for a lightening of the color, such distillation may be dispensed with for most technical purposes. The boiling point of the liquid at the said pressure is from 156° to 158° C., the refractive index is $n_D^{20}=1.506$ and an analysis gave a nitrogen content of 4.98. The liquid has a specific gravity of 1.05 at 20° C. and does not solidify on extended cooling to —15° C. It is completely miscible with kerosene fractions of petroleum in all proportions, gasoline and methanol, and is also soluble to the extent of at least 20% by volume in halogenated lower hydrocarbons, such as carbon tetrachloride, chloroform, di- and tri-chlorethylenes and the mixed fluorinated chlormethanes and ethanes, such as the trifluoro trichloroethane, of the "Freon" series. Solutions of the pyrrolidine in the aforesaid solvents of low boiling point can be used for preparing solid dispersions of the pyrrolidine, for instance on talcum or like carrier, by mixing the solution with or spraying it onto the carrier and evaporating the solvent in any of the usual methods known therefor.

*Example 2*

120 parts of water white "deobase" (deodorized kerosene, as used in insecticide sprays) are added to the mixture of the succinic anhydride and toluene referred to at the beginning of the second paragraph of Example 1. Though some succinic anhydride is precipitated thereby, the same procedure is followed except that the heating period is shortened by about ⅕ to ¼, owing to a quicker separation of water. The resulting light amber solution is worked up as described in Example 1. The clear solution obtained has the same refractive index as a solution prepared from 27.4 parts of the pyrrolidine product obtained in Example 1 and 12 parts of deobase.

For the preparation of an efficient insecticide, for example, 10 gms. of the pyrrolidine obtained in Example 1, or 14.38 gms. of the pyrrolidine-deobase mixture obtained in Example 2, are dissolved in 800 ccs. of deobase, and to the solution thus formed 200 ccs. of a deobase solution of pyrethrum extract, said deobase solution containing 0.1 gm. of pyrethrins for each 100 ccs. of the solution, are added with stirring.

If desired, from 2 to 10 gms. of di-(p-chlorphenyl)-trichloroethane may be dissolved in the 800 ccs. of deobase prior to the dissolution of the pyrrolidine. If smaller quantities of less than 5 grams of the said trichloroethane are to be used, they may be directly incorporated in the above mentioned quantities of pyrrolidine or pyrolidine-deobase mixture, preferably while warming to about 35° C.

For most purposes it is sufficient to use the beforementioned lower concentrations of the halogen compound as they give excellent results. Solutions in deobase of from 0.7 to 1% of the pyrrolidine with from 0.2–0.4% of di-(p-chlorphenyl)-trichloroethane and 0.01–0.02% of pyrethrins (the latter giving a knockdown of about 90% and a kill of about 35% in the O. T. I. concentration of 0.1%) gave a kill of about 85% and a knockdown of about 90–95%, or a total mortality of up to 100%.

What I claim is:

1. The process which comprises refluxing about equimolecular amounts of 1,4-cyclopentenylene succinic acid anhydride and of 2-ethyl hexylamine in substantially dry toluene used in an amount by weight at least equal to that of said anhydride, and separating the water formed in the reaction from the refluxing liquid.

2. The process which comprises dissolving solid 1,4-cyclopentenylene succinic acid anhydride in an at least equal amount by weight of substantially dry toluene, adding about an equimolecular amount of 2-ethyl hexylamine to the toluene solution, refluxing the mixture thus formed and separating the water formed in the reaction from the refluxing liquid.

3. The process which comprises refluxing about equimolecular proportions of 1,4-cyclopentenylene succinic anhydride and of 2-ethyl hexylamine in a quantity of dry toluene at least equal that of said anhydride while separating water from the refluxing liquid at least until one molecular proportion of water has separated for each molecular proportion of said anhydride, washing the resulting solution with sodium carbonate and distilling off toluene.

4. The process which comprises dissolving solid 1,4-cyclopentenylene succinic acid anhydride in an at least equal amount by weight of substantially dry toluene, adding about an equimolecular amount of 2-ethyl hexylamine to the toluene solution, refluxing the mixture thus formed in the presence of 20 to 65% by weight, based on the weight of toluene, of deodorized kerosene, and separating the water formed in the reaction from the refluxing liquid.

5. A composition of matter comprising N-2-ethyl hexyl $\alpha,\alpha'$-di-keto $\beta,\beta'$-(1,4-$\Delta^2$-cyclopentenylene)-pyrrolidine.

ALBERT A. SCHREIBER.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,393,999 | McCrone | Feb. 5, 1946 |
| 2,405,559 | Bousquet | Aug. 13, 1946 |
| 2,424,220 | Bousquet | July 22, 1947 |

OTHER REFERENCES

Newman et al.: Jour. Am. Chem. Soc., vol. 68 (October, 1946), pp. 2112 to 2115.